Sept. 13, 1938. J. K. GRAHAM Re. 20,856
CHIPPING AND CUTTING TOOL
Original Filed Jan. 23, 1934
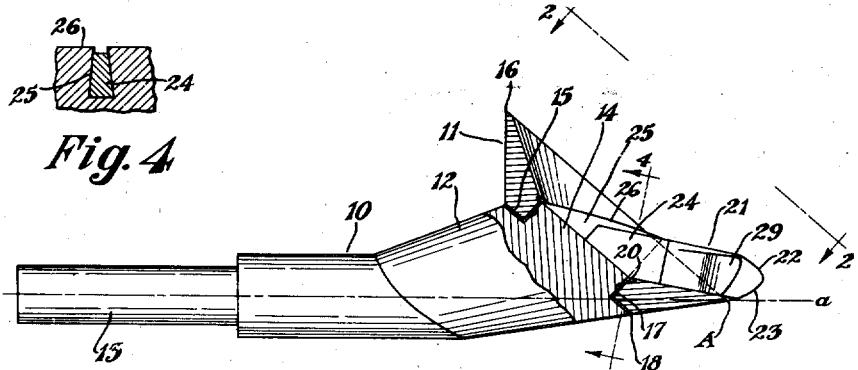
Fig. 4
Fig. 1
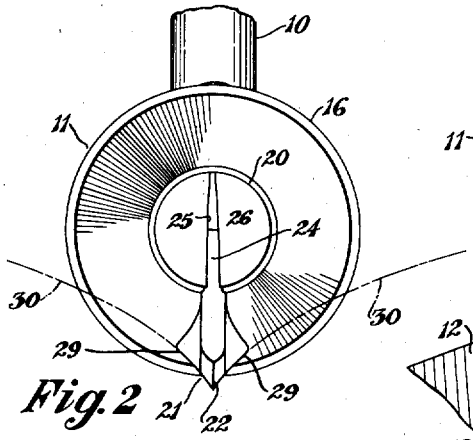
Fig. 2
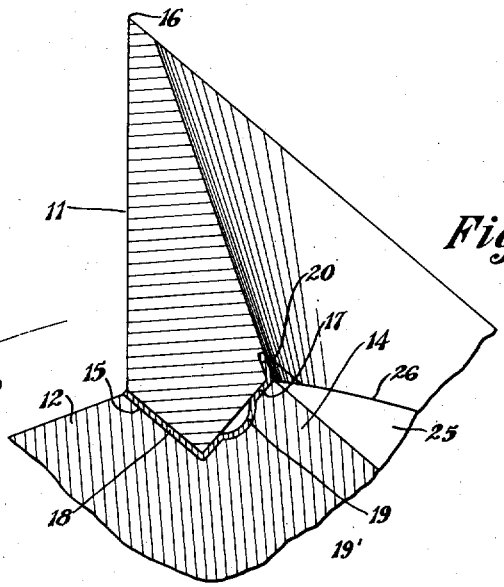
Fig. 5
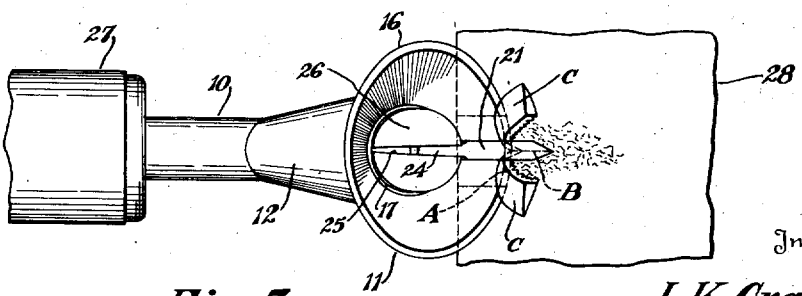
Fig. 3
Inventor
J. K. Graham
By Frease and Bishop
Attorneys Reissued Sept. 13, 1938

Re. 20,856

UNITED STATES PATENT OFFICE 20,856

CHIPPING AND CUTTING TOOL

Joyce K. Graham, Canton, Ohio

Original No. 2,009,795, dated July 30, 1935, Serial No. 707,933, January 23, 1934. Application for reissue July 27, 1937, Serial No. 155,947

11 Claims. (Cl. 30—168)

The invention relates to a tool especially adapted for use in connection with an air hammer for chipping the surface defects from semi-finished rolling mill products such as billets and the like, although the improved tool may be used for any kind of cutting work in machine tool practice.

In the production of billets and other semi-finished rolling mill products, the surfaces of such products contain many defects such as scale, seams, slivers, snakes, scabs and the like which must be removed from the semi-finished product in order that a satisfactory finished product may be rolled therefrom.

The volume of the metal thus removed from the surfaces is approximately two per cent of the weight of the billet or the like and under present practice this chipping operation increases the cost of production from four to five dollars per gross ton.

This high cost of chipping is due not only to the large amount of manual labor required but also to the rapid failure of the chisels used in the air hammers and the excessive cost of grinding and redressing the chisels, which work is ordinarily manually performed.

In an effort to cut down this exhorbitant chipping cost, steel manufacturers have spent enormous sums of money experimenting with various methods of chipping. Principally, these experiments have consisted in the use of large and expensive machines employing machine tool principles, said machines embodying motor and gear driven mechanism effecting a slow, steady, forward movement frequently lacking flexibility and requiring the use of "high speed" tools as compared with the carbon steel tools used with the chipping hammer.

The tool itself being the deciding factor of cutting time in both chipping hammer and machine tool practice, as mechanical principles in both are unlimited as to power and speed, and the machine principle requiring "high speed" steel tools while the chipping hammer requires only carbon steel tools, it is evident that the velocity and impact embodied in hammer operation provides for superior tool efficiency, since carbon steel has no cutting value in machine tool practice. The machine tool principle may thus be eliminated because of tool deficiency, wherefore it is believed that the practical way to reduce chipping cost is to provide a tool especially adapted for chipping hammers and designed to overcome the above objections.

The object of the improvement is therefore to provide a tool especially adapted for use in chipping hammers and so constructed that it will largely eliminate resistance to cutting and will shorten the cutting or chipping time, the structure of the tool being such that it will not quickly fail in use and may be quickly and cheaply ground, thus eliminating much of the cost of grinding and redressing.

An important object of the invention is the provision of a cutting or chipping tool including a shank having an angular shoulder at its forward end and an integral, angular projection formed on the shank adjacent to said shoulder and located at an oblique angle to the longitudinal axis of the shank, the shoulder and projection together providing an angular oblique mating surface for a cutting head adapted to be mounted upon said projection, the forward portion of said angular mating surface being located substantially in the longitudinal axis of the shank.

Another object is to provide a tool of the character referred to formed of a shank portion and a cutting head portion, thus eliminating much of the present waste in discarding short tools.

A further object of the improvement is to reduce the resistance to a minimum by providing means for slitting the portion of the surface to be removed before the chipping or cutting operation is performed.

Another object is to provide a cutting or chipping tool having a continuous cutting edge.

A still further object is to provide a tool of such construction that a large group of the tools may be quickly and easily machine ground at one time, and due to the machine grinding, the cutting edge may be ground more accurately.

Another object is to provide a tool of such character that it will provide a better hand leverage for the operator when used in a chipping hammer.

A still further object of the improvement is to provide added weight at the cutting end of the tool, thus adding to the cutting advantages.

The above, together with other objects which will be apparent from an inspection of the drawing and the following description, or which may be later pointed out, may be attained by constructing the improved tool in the manner illustrated in the accompanying drawing, in which Figure 1 is a side elevation of the improved tool, parts being broken away for the purpose of illustration;

Fig. 2, an end elevation of the tool viewed substantially on the line 2—2, Fig. 1;

Fig. 3, a top plan view of the tool on a smaller scale;

Fig. 4, a detail section showing the manner in which the slitting tool may be secured to the shank portion of the cutting tool, taken as on the line 4—4, Fig. 1; and Fig. 5, an enlarged detail section through a portion of the cutting tool showing the steel liner which may be interposed between the cutting head and the shank portion of the tool.

Similar numerals refer to similar parts throughout the drawing.

The improved tool may include the tool holder or shank portion indicated generally at 10 and the cutting head indicated generally at 11 and adapted to be detachably secured to the angular tool holder portion 12 of the member 10 while the reduced shank end 13, formed at the opposite end thereof may be received in the nozzle of a chipping hammer or in the tool holder of any machine as in usual practice.

The end of the angular tool holding portion 12 is provided with the integral, angular, central boss 14 surrounded by the annular shoulder 15 to receive the cutting head 11 which is annular as shown and preferably tapered from the center toward the cutting edge 16.

This cutting edge of the tool is continuous, as shown in the drawing, and may be circular as shown or of any polygonal contour without departing from the invention, an essential feature of which is to provide the continuous cutting edge upon the tool.

The annular, angular shoulder 15 and the angular projection or boss 14 form an angular oblique mating surface for the cutting head, the forward portion of said mating surface being located substantially in the axis of the shank, as indicated by the line *a—a* shown in Fig. 1 of the drawing, as passing through the apex or angle of this mating surface.

If desired, a steel liner ring 17 may be provided between the cutting head and the tool holder or shank member for the purpose of absorbing the impact as well as to assist in detachably securing the cutting head to the holder. This liner ring may be provided with the angular flange 18 received between the lower edge of the annular cutting head 11 and the shoulder 15 of the tool holder.

An inwardly disposed annular rib 19 may be formed in the liner ring 17 to be received within the annular groove 19′ formed around the periphery of the boss 14 and the upper or outer edge of the ring 17 may be bent or formed backward over the edge of the cutting head 11 as indicated at 20. This steel liner ring to a great extent prevents the impact from being transferred from the cutting head to the shank portion of the tool, thus greatly reducing tool fatigue failures at the shank of the tool.

The angle of the cutting head to the tool holder or shank member is such that the working portion of the cutting edge 16, as indicated at A, is located in the axis of the tool holder or shank member 10, which is indicated in Fig. 1 by the broken line *a—a*.

In order to provide for free tooling of the chipping or cutting tool, so as to eliminate resistance to cutting, a slitting tool is provided to first slit the portion of the surface to be removed by the cutting or chipping tool so that each chip is removed in two substantially equal portions by the chipping or cutting tool.

Under present practice, in the cutting, turning or chipping of metals, the work done and the heat generated in performing this work are concentrated in a relatively small area between the tool and the work and the power consumed is converted into heat due to friction and displacement of the metal. The tool pries or tears the chip away from the work rather than cutting it, the sharp edge of the tool merely clearing up and smoothing the surface of the work while the actual heavy work is done at some distance from the cutting edge of the tool where the chip bears down upon the tool and begins to curl, break up and crumble.

By providing this slitting tool for first slitting the surface of the metal before the chip is removed by the cutting tool, the above described condition is substantially eliminated.

The slitting tool is indicated generally at 21 and may be carried by the same tool holder as the cutting tool, as illustrated in the drawing, or if desired, may be carried in a separate holder and used to slit the surface prior to the cutting operation by the cutting or chipping tool, the object of the same being merely to slit the surface in advance of the cutting or chipping operation.

The V-shaped cutting edge of the slitting tool 21 is tapered forwardly as shown at 22, as well as downwardly as indicated at 23, so that there will be the least possible resistance in the operation of this tool. The shank portion 24 of the slitting tool is preferably dove-tail in cross section as best shown in Fig. 4, and is received within a similarly shaped groove 25 formed in the inclined portion 26 of the central boss 14 upon the tool holder member.

In Fig. 3 is shown an illustration of the improved tool used for chipping, the same being carried by a chipping hammer, a portion of the nozzle of which is indicated generally at 27, the tool being shown in the operation of slitting and chipping a billet or the like, a portion of which is indicated generally at 28. As will be seen, the slitting tool 21 first slits the surface to be chipped as indicated at B, after which the cutting edge of the cutting tool 11 removes the desired amount of the surface of the metal in the form of two chips, each indicated at C.

With the improved cutting or chipping tool it will be seen that the cutting edge is about nine times that of the ordinary cutting or chipping tool such as is now in general use. The tool thus has a much longer life than the ordinary tool as the cutting head 11 is so mounted upon the tool holder or shank that it may be easily rotated so as to bring a new portion of the cutting edge into working position.

If desired, a lip 29 may be formed on each side of the slitting tool 21, as shown in Figs. 1 and 2, for the purpose of spreading or bending the chips, as indicated by the broken lines 30, by means of the slitting tool, relieving the cutting edge of the tool 11 of the stress and strain of coiling the chip, and reducing the resistance to cutting or chipping.

With the use of the improved cutting or chipping tool, by slitting the metal before the cutting or chipping operation, all heavy work by the cutting edge is eliminated and the grain structure is not broken down nor the surface removed completely transformed as in ordinary practice, thereby greatly increasing cutting efficiency and reducing to a minimum fatigue failure in tools and excessive wear in operating parts of the hammer and the like.

The improved tool not only takes the stress and fatigue from the hammer and tool, but also eliminates considerable fatigue of the operator of the hammer, so that a greater amount of work may be more efficiently accomplished by the operator with greater ease and comfort.

I claim:

1. A metal cutting or chipping tool adapted for use on a reciprocating hammer including a shank or tool holder member and an annular cutting head mounted thereon at an angle to the longitudinal axis of the shank and having a continuous cutting edge located at an oblique angle to said axis of the shank, said angle at which the cutting head is located being such that the working portion only of the cutting edge is located in the longitudinal axis of the shank.

2. A metal cutting or chipping tool adapted for use on a reciprocating hammer including a shank or tool holder member and an annular cutting head mounted thereon at an angle to the longitudinal axis of the shank and having a continuous cutting edge located at an oblique angle to said axis of the shank, said angle at which the cutting head is located being such that the working portion only of the cutting edge is located in the axis of the shank, and a liner ring interposed between the tool holder member and the cutting head, said liner ring being fixed to the cutting head and means for detachably securing the liner ring to the tool holder.

3. A metal cutting or chipping tool adapted for use on a reciprocating hammer including a shank or tool holder member having an integral angular boss at one end at an oblique angle to the longitudinal axis of the shank, an annular cutting head mounted upon said boss at an angle to said axis of the shank and having a continuous cutting edge, said angle at which the cutting head is located being such that the working portion only of the cutting edge is located in the longitudinal axis of the shank.

4. A metal cutting or chipping tool adapted for use on a reciprocating hammer including a shank or tool holder member having an angular boss at one end at an oblique angle to the longitudinal axis of the shank, an annular cutting head mounted upon said boss at an angle to said axis of the shank and having a continuous cutting edge, said angle at which the cutting head is located being such that the working portion only of the cutting edge is located in the axis of the shank, and a liner ring interposed between the cutting head and said boss, said liner ring being fixed to the cutting head and means detachably securing the liner ring to the boss.

5. A cutting or chipping tool including a shank or tool holder member having an angular boss at one end, an annular cutting head mounted upon said boss and having a continuous cutting edge, the cutting head being located at such an angle to the shank that the working portion of the cutting edge is located in the axis of the shank, and a liner ring interposed between the cutting head and said boss, said liner ring having an annular rib and the boss having an annular groove receiving said rib.

6. A cutting or chipping tool including a shank or tool holder member and an annular cutting head mounted thereon and having a continuous cutting edge, the cutting head being located at such an angle to the shank that the working portion of the cutting edge is located in the axis of the shank, and a slitting tool mounted in advance of the cutting head and adapted to slit the surface of the work before the cutting head engages the work.

7. A cutting or chipping tool including a shank or tool holder member having an angular boss at one end, an annular cutting head mounted upon said boss and having a continuous cutting edge, the cutting head being located at such an angle to the shank that the working portion of the cutting edge is located in the axis of the shank, and a slitting tool mounted upon said boss and located in advance of the cutting head.

8. A metal cutting or chipping tool adapted for use on a reciprocating hammer including a shank or tool holder member having an angular boss at one end at an oblique angle to the longitudinal axis of the shank, and a shoulder surrounding said boss, an annular, hollow, conical cutting head mounted upon said boss at an angle to said axis of the shank and seated against said shoulder and having a continuous cutting edge, said angle at which the cutting head is located being such that the working portion only of the cutting edge is located in the longitudinal axis of the shank.

9. A combined metal slitting and cutting or chipping tool adapted for use upon a reciprocating hammer including a tool holder member, a slitting tool carried by the tool holder member and having a substantially vertical, sharp, V-shaped slitting edge adapted to merely slit the surface of metal in a plane at right angles to said surface, and a cutting or chipping tool carried by said tool holder member and having a cutting edge located below and behind the slitting edge substantially at right angles to the slitting edge and adapted to cut into the metal parallel to said surface and remove the portion of the surface thereof which has been slit by the slitting edge.

10. A cutting or chipping tool including a shank or tool holder member having an angular shoulder at one end and an integral angular projection adjacent to said shoulder at an oblique angle to the longitudinal axis of the shank, and a cutting head mounted upon said projection and seated against the shoulder, the projection and shoulder providing an angular oblique mating surface for the cutting head, the apex of the forward portion of said mating surface being so located that a straight line drawn through the cutting edge of the cutting head and through said apex will extend backward through the shank.

11. A cutting or chipping tool including a shank or tool holder member having an angular shoulder at one end and an integral angular projection adjacent to said shoulder at an oblique angle to the longitudinal axis of the shank and an annular cutting head mounted upon said projection and seated against the shoulder and having a continuous cutting edge, the projection and shoulder providing an angular oblique meeting surface for the cutting head having the apex of its forward portion so located that a straight line drawn through the cutting edge of the cutting head and through said apex will extend backward through the shank.

JOYCE K. GRAHAM.